United States Patent [19]

de Hertel Eastcott

[11] Patent Number: 4,635,769

[45] Date of Patent: Jan. 13, 1987

[54] GEAR PROTECTION SYSTEM FOR GRINDING MILLS

[75] Inventor: Peter de Hertel Eastcott, Peterborough, Canada

[73] Assignee: Canadian General Electric Company Limited, Toronto, Canada

[21] Appl. No.: 837,269

[22] Filed: Mar. 7, 1986

[51] Int. Cl.⁴ .................... F16D 7/02; F16D 43/20
[52] U.S. Cl. ................ 192/0.034; 192/0.084; 192/0.096; 192/56 F; 192/88 B; 192/150
[58] Field of Search ............... 192/56 R, 150, 0.02 R, 192/0.096, 0.034, 0.084, 88 B, 56 F

[56] References Cited

U.S. PATENT DOCUMENTS

| | | | |
|---|---|---|---|
| 2,781,118 | 2/1957 | Pechy | 192/0.034 X |
| 2,918,999 | 12/1959 | Eddy | 192/0.034 X |
| 3,599,067 | 8/1971 | Wallis | 192/150 X |
| 3,958,681 | 5/1976 | Sugahara et al. | 192/88 B |
| 4,110,768 | 8/1978 | Numata | 192/150 X |
| 4,478,320 | 10/1984 | Baba | 192/150 X |

FOREIGN PATENT DOCUMENTS 843236 6/1970 Canada .
934679 2/1973 Canada .

Primary Examiner—George H. Krizmanich
Attorney, Agent, or Firm—Raymond A. Eckersley

[57] ABSTRACT

A clutch is interposed between the driving gears of a grinding mill and the driving motor to protect the gears from damage by mechanical overloading. The clutch is set to slip at torques below those required to structurally damage the gears yet higher than design load and the clutch released and the mill is shut down after a preset degree of clutch slippage occurs.

16 Claims, 5 Drawing Figures

GEAR PROTECTION SYSTEM FOR GRINDING MILLS

FIELD OF THE INVENTION

The present invention relates to gear protection for a grinding mill. More particularly, the present invention relates to the use of a slip clutch adapted to slip at a preset load condition below the yield strength of the gears being protected and to release when a preset degree of clutch slippage occurs.

BACKGROUND OF THE PRESENT INVENTION

The drive train in many ore grinding mills includes a ring gear and at least one pinion that is driven by a suitable known art motor. In such installations the gears are the weakest link in the drive chain and though designed for up to four times normal stresses (factor of safety of 400%) still in unusual circumstances are subjected to damaging mechanical stress conditions, for example, the motor can under certain fault conditions generate up to about ten to twelve times its rated torque. Similarly conditions to which the teeth of the gears are subjected, if the mill is run under resonance conditions for too long a period of time, will build up to exceed by a significant margin the maximum design four hundred percent factor of safety for the gears.

It is extremely important that the gearing even though it is the weakest link should not fail since the replacement cost of a gear set may be well over a million dollars and more important manufacturing lead time is likely to be in the order of at least 8 months and up to about 12 months which may require a long and costly shutdown period.

As above indicated these damaging overload conditions are not encountered frequently. The problem of mechanical resonant frequencies with constant speed drive mills has generally been dealt with during the design of the mill by adjusting motor shaft stiffness etc., before the equipment is built so that the operation is carried out remote from resonant torque amplification values. Obviously this requires some compromise between the various design options. When constant speed operation is contemplated this design technique has been satisfactory even though it is common to encounter at least one resonant condition during mill acceleration to operating speed. It is essential that the mill reach operating speed and pass through these resonant conditions without any permanent damage. Therefore, the mill is normally brought to speed by rapidly traversing the resonant frequency zones. These resonant speeds are passed through rapidly enough so that torsional oscillations do not have time to build up to a dangerous level and cause mill damage particularly gear damage.

In modern mills the use of variable operating speeds selected by the mill operator located in a remote control room, increases significantly the opportunity for the mill to operate right on or immediately adjacent a resonant frequency speed thereby increasing the requirements for gear protection.

Clutches are used in the drive chain of the mill for example to control the torque applied to the mill from two separate power sources to balance the torque so applied between the power sources. Canadian Pat. No. 934,679 issued Oct. 2, 1973 to Eastcott et al utilizes clutches in the drive chain to share the load by intermittently disengaging the clutches for preselected periods of time depending on the torque being transmitted. These clutches are also used during start up to bring the mill to speed by controlled clutch slippage.

BRIEF DESCRIPTION OF THE PRESENT INVENTION

It is an object of the present invention to provide gear overload protection for an ore grinding mill or other heavy loads.

It is a further object of the present invention to provide a gear overloading system for a grinding mill particularly to protect the gearing in the event of inadvertant operation at resonant frequency.

Broadly the present invention relates to a drive gear overload protector for a grinding mill having gears designed with a yield strength well above the normal load to be transmitted through the gears comprising, a clutch means interposed between said gears and a motor driving said gears, means for setting the maximum torque to be transmitted by said clutch to a value less than the force necessary to apply forces to exceed said yield strength to said gears and significantly higher than that necessary to transmit the normal load whereby said clutch may slip before said gears are damaged, means determining clutch slippage and means for releasing said clutch when said clutch has slipped a preset amount and before said clutch has been subjected to excessive heating and wear. Clutch slippage may be determined in a variety of ways including direct measurement or indirect measurement through torque analysis or the like.

BRIEF DESCRIPTION OF THE DRAWINGS

Further features, objects and advantages will be evident from the following detailed description of the preferred embodiments taken in conjunction with the accompanying drawings in which.

DESCRIPTION OF THE PREFERRED EMBODIMENTS

Figure 1:
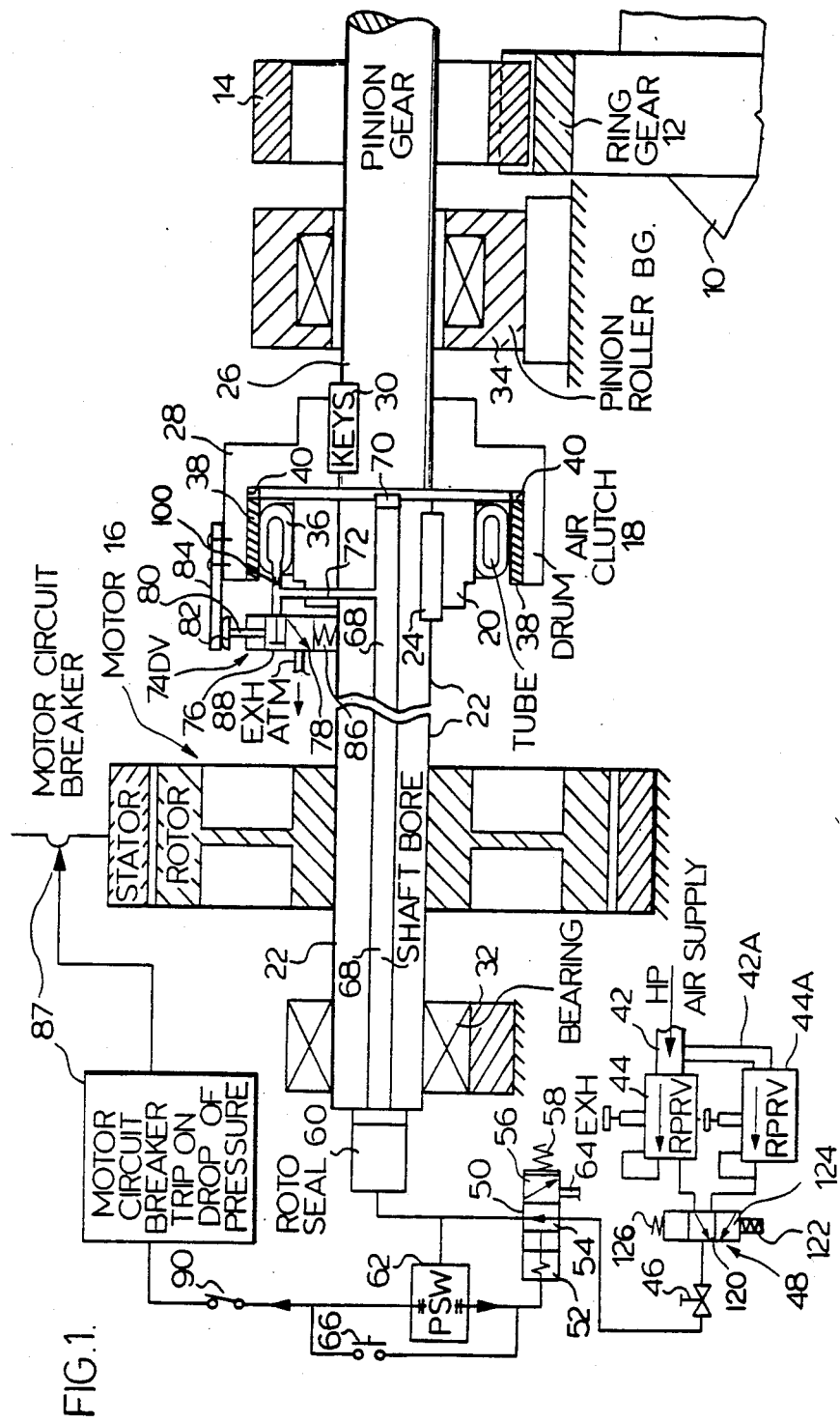
FIG. 1 is a schematic illustration of a preferred type of overload detection incorporated on a mill wherein clutch slippage is not used for starting or load balancing.

As shown in FIG. 1 the present invention is applied to a grinding mill schematically indicated at 10 which is driven by a ring gear generally indicated at 12 through a pinion indicated at 14. The pinion is driven via a motor 16 through a clutch 18 which in the illustrated arrangement is an air clutch having its spider hub 20 keyed to the motor shaft 22 via a key 24. The pinion shaft 26 is connected to the drum hub 28 of the air clutch 18 via a suitable key 30. It will be apparent that the shafts 22 and 26 are mounted in suitable bearings such as the bearing illustrated at 32 for the motor shaft 22 and the pinion roller bearing 34 for the pinion shaft 26.

Referring back to the clutch 18 it will be noted that mounted on the spider 20 is a suitable air tube 36 expandable on inflation with air which is used to expand the friction plate or liner 38 against the inner surface 40 of the drum 28.

High pressure air at say 100 to 150 psi is delivered to relieving pressure reducing valve (RPRV) 44 which sets the clutch operating air pressure in tube 36 at some lesser continuous pressure such that the friction clutch shoes or plates 38 will commence slip between the surfaces of the clutch plates 38 and the surface 40 of drum 28 at the desired limiting torque value. The pressure setting of valve 44 is determined by field tests at the time the drive is commissioned. The regulated constant pressure from valve 44 flows through needle valve (NV) 46 which purposely restricts the flow of air into the closed pneumatic system to a low value estimated to be about 10 times the probable small parasitic leaks to atmosphere of the system. Valve 44 and needle valve 46 therefore constitute a constant pressure air supply of low capacity, and under normal operation the air pressure on both sides of the needle valve 46 is essentially the same since the flow through it is negligible. Those skilled in the art of pneumatic system design wil recognize that if pressure reducing valve 44 is downsized sufficiently, needle valve 46 may be omitted.

A second relieving pressure relief valve 44A is shown connected to supply line 42 via branch line 42A and both valves are selectively connected to the needle valve 46 via a suitable spool valve 48 or the like. The valves 44A and 48 in many cases will be omitted and will generally only be incorporated when special start up conditions are encountered as will be described hereinbelow.

Air from needle valve 46 is piped to a normally open 3-way dump valve (NODV) 50 which is shown in its energized position with electric solenoid 52 thrusting valve spool sections 54 and 56 to the right against the opposition of spring 58. In this energized position, section 54 of the valve spool connects the regulated air pressure from valve 46 to a roto seal 60, and pressurizes pressure switch (PSW) 62.

Normally open contacts of pressure switch 62 are adjusted to close at a pressure slightly below the regulated system pressure set by valve 44 (say about 90% of regulated system pressure) to continuously feed electrical energy to solenoid 52 to hold valve 50 in the position shown against the thrust of spring 58. Should the clutch system pressure fall more than say 10 percent below the preset value of valve 44, pressure switch 62 will open its contacts to deenergize solenoid 52. Spring 58 will then shift valve spool section 56 into what was the energized position of section 54 venting the system to atmosphere through valve port 64. Those familiar with pneumatic terminology will recognize the configuration of valve 50 as being Normally Open in that it dumps the system air pressure to atmosphere when solenoid 52 is deenergized.

It will be apparent that during start up the switch 62 must be bypassed. A suitable switch 66 is interposed in parallel with pressure switch 62 to instantaneously supply power to the solenoid 52 until the pressure in the system has built up.

Roto seal 60 is located centrally on the outboard end of motor shaft 22 and transmits air pressure from the stationary piping from valve 50 to rotating shaft 22. Shaft 22 has a central bore 68 of suitable size for example approximately 1 to 1½ inches in diameter closed at its drive end by plug 70. Radial communicating cross bores 72 (only one shown) and flexible piping carry the system air pressure to air tube 36 which inflates to press friction liner 38 radially outwards against clutch drum inner surface 40 with a unit pressure directly proportional to the system air pressure. Those skilled in friction brake and clutch design will appreciate that since the unit pressure with which the friction lining 38 is pressed against the rubbing surface of clutch drum 28 is directly proportional to the inflation thrust of tube 36, the torque that may be transmitted from motor shaft 22 to pinion shaft 26 through the clutch 18 when slip is impending will be directly proportional to the system air pressure and is therefore controlled by the pressure setting of valve 44.

One or more normally open 3-way Dump Valves (DV) 74 are mounted on the clutch spider assembly 20. The spools of said valves have two sections 76 and 78. The stem 80 of the valve 74, carries a cam or curved shaped head 82 which is pressed radially inwards by narrow bracket 84 mounted on clutch drum 28. Head 82 is cam shaped so that it can pass under successive brackets 84 during clutch slip fault conditions. The bracket 84 is narrower than the cam shaped surface of head 82 measured circumferentially as will be described in more detail hereinbelow. The head 82 is urged radially outward as are the spools 76 and 78 of the valve 74 to hold the head 82 against bracket 84 by a spring 86.

The drive motor 16 is rotated manually when at rest, until bracket 84 lines up with valve stem head 82 with valve 50 deenergized, and then valve 50 is permanently energized. Solenoid 52 of valve 50 is usually fed with power from the storage battery uninterruptable power supply that is used to trip the mill circuit breakers such as the motor breaker schematically illustrated at 87. Hence, on nuisance power interruptions, valve 50 remains energized and clutch position is not disturbed. Valve 50 is only deenergized to dump the system pressure to atmosphere when either the contacts of pressure switch 62 open on dropping pressure in the system, or in response to manually operated series selector switch 90 as may be needed for clutch maintenance and initial angular alignment purposes.

The equipment configuration provides a simple, reliable, low cost means of controlling said friction clutch 18 to slip at a predetermined overload torque level by means of the regulated pressure setting of (RPRV) 44 and precisely detecting when a preset degree of clutch slippage occurs to release the clutch.

Figure 2:
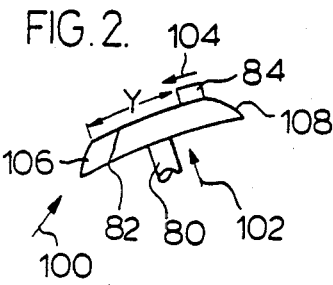
FIG. 2 is a schematic illustration of the means for determining the amount of clutch slippage (view to an axial direction) and for releasing the clutch.
Figure 3:
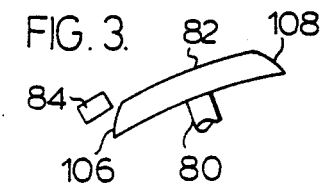
FIG. 3 is a view similar to FIG. 2 but showing the elements in position after a preset amount of clutch slippage has occurred and the clutch has been released.
Figure 4:
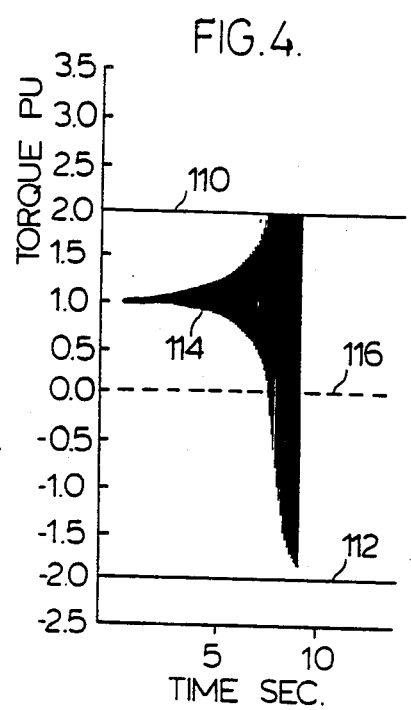
FIG. 4 is a typical torque curve showing the buildup of forces under resonant conditions and the effect of the present invention.

A better understanding of the present invention can be had from reference to FIGS. 2, 3 and 4.

FIG. 2 shows the position of the head 82 and bracket 84 under normal operating conditions. The arrow 100 indicates the direction of rotation of the clutch, arrow 102 indicates the direction in which the camming surface of head 82 is urged by the spring 86 (FIG. 1) and the arrow 104 indicates the direction of relative movement between the bracket 84 and head 82, i.e. in the direction reverse to the direction of rotation of clutch. Obviously in some other fault conditions the relative movement between bracket 84 and head 82 may be in the opposite direction.

It will be noted that at opposite ends of the cam shaped surface of head 82 there are provided curved ramps 106 and 108 respectively that function as camming surfaces to move the stem 80 in the opposite direction to the arrow 102 to compress the spring 86 (FIG. 1) when the device is reactivated. The circumferential distance Y indicates the amount of relative movement between the spider 20 and drum 28 that must occur before valve 74 is release to move outwardly, thus dropping pressure sufficiently to operate switch 62 causing the valve 50 to be released and moved from the position illustrated in FIG. 1 to the exhaust position where the passage through the spool 56 connects the piping from tube 36, passage 68 etc to atmospheric port 64 (FIG. 1). It will be noted that in the position of FIG. 3 head 82 has been moved radially outwardly by the spring 86 (FIG. 1) since bracket 84 is no longer preventing such outward movement of head 82.

The torque conditions that are generated in the resonant condition of operation are illustrated in FIG. 4 wherein torque in per unit (PU) (i.e. PU of 1 is the design torque for the equipment, PU of 2 is twice design torque, PU 3 three times design torque etc.) is plotted against time. In the arrangement illustrated the clutch has been set so that it slips at a PU of 2 (plus and minus) as indicated by the lines 110 and 112. As the speed of the machine is adjusted and approaches a resonant condition the torque commences to build up as indicated by the curve 114 during about 3 second period. The torque rapidly builds up during resonance which in the illustration has become damaging within about 3 seconds to 4 seconds of commencing. The damaging torque is limited on the positive side of the curve in the direction of torque applied by the drive by slippage of the clutch at the preset 2 PU torque as indicated by the line 110. This clutch slippage prevents undue forces being applied to the gears. It will be noted that the torque in the opposite direction continues to build although not as rapidly as it would build if the clutch had not slipped. In the illustrated arrangement the torque is built up in the opposite direction to drive torque to about 1.7 times design torque i.e. a PU of −1.7 but not enough to damage the gears. Obviously the clutch slippage occurs only in one direction as the point of clutch slippage as indicated by the line 112 has not occurred under torque conditions in the opposite direction. This clutch slippage is cumulated and tends move the cam surface of head 82 relative to the bracket 84 (FIG. 1). If the system is subjected to resonant frequencies for a long enough time damaging forces are likely to be generated, but are limited by the clutch slippage which causes bracket 84 to pass off the surface of the head 82 and as above indicated to release the clutch and shut down the whole unit whereupon the torque curve substantially disappears.

In FIG. 4 the torque has been permitted to build up in the opposite direction (to the drive direction) to be significantly above the zero position which means that the teeth of the gears will be chattering. It is preferred though not always possible to limit the torque build up in the negative direction so that the torque does not reach zero, i.e. the value indicated by broken line 116, FIG. 4. This obviously is not possible with preset cutoff set at 2 PU and the particular resonant conditions encountered in the illustration. However in cases where resonant resultant torque does not build up as rapidly this can be achieved by proper selection of the torque at which the clutch 18 slips.

Referring back to FIG. 1 it will be noted that there is a slight constriction 100 in the line from tube 36 to the valve 74 to ensure that the pressure in the bore 68 is dumped and drops at least 10% to operate the pressure switch 62 relatively rapidly.

Only one dump valve 74 has been shown, however, in a preferred arrangement there will be three of these devices uniformly spaced around the circumference of the clutch 18 i.e. at 120° intervals.

The following provides an example of the above embodiment of the present invention and is not intended to be limiting in any manner.

If the circumferential width of head 82 is say 3 inches and it is rotating on a diameter of say 60 inches, then simple arithmetic will show that a relative angular movement of 3.82 degrees between hub 20 and drum 28 will cause the head 82 to move clear of bracket 84 and allow spring 86 to shift the valve spools so that spool 78 causes the valve to dump the air pressure in central bore 68 and tube 36 to atmosphere through a valve port 88. For practical considerations, the slight constrictions 100 in the inlet piping to tube 36 may be needed to ensure that when valve 74 moves to it dump position upon relative clutch angular motion occuring, that the pressure in the bore 68 drops 10 percent to operate pressure switch 62 in perhaps 0.01 seconds. Pressure switch 62 deenergizes (NODV) 50 and also trips high speed circuit breaker 87 to remove power from motor 16. The drive then coasts to rest, the cause of the overtorque condition is determined and corrected, the motor rotor is then manually repositioned with valve 50 deenergized so that brackets 84 are radially aligned with and depressing respective cam valve heads 82, and valve 50 is then reenergized to restore the system to normal on the next start.

As above indicated when the mill is brought to operating speeds it sometimes must traverse a resonant zone. Normally this is done relatively quickly so that the resonant torque buildup is small and would not cause clutch slippage. However in some mills this build up might create a problem and means would have to be provided to bring the system up to speed through the resonant zone without any excessive slippage of the clutch 18. For this reason the auxiliary line 42A and relieving pressure relief valve 44A together with valve 48 have been shown in FIG. 1. With the position of the valve 48 such that the spool 120 is in position as illustrated the valve 44 is connected to the needle valve 46. However on startup it may be desirable to switch by operating the solenoid 122 to bring the spool 124 to operative position and connect the pressure releasing valve 44A to the needle valve 46 and use the pressure of the valve 44A to set the system pressure. Under these circumstances for startup the valve 44A may be set to operate say at 100 psi or a clutch release setting of 2.5 or 3 PU as compared with the release setting of 2 PU when lower pressure setting by the valve 44 was operative. In other words operation with valve 44A operative increases the forces necessary to make the clutch slip. It will be apparent that when the solenoid 122 is released the spring 126 will move the unit back to the position as illustrated. The self-releaving pressure relief valves 44 and 44A automatically relieve the pressure in the system as defined by the bore 68 tubes 36 etc. to the pressure setting of the respective valves so that when the valve 44A is disconnected and valve 44 connected the pressure in the overall system is reduced to the pressure set in valve 44.

Obviously the increased pressure in the tubes 36 when the valve 44A is operative will not permit the clutch to slip at the lower torque at which the valve 44 permitted slippage, however if the unit is subjected to a significantly high torque that could damage the pinion 14 or more likely in gear 12 the clutch 18 is still set to slip before the yield strength of the gear 12 is exceeded and permanent damage done to the gear. Thus, even on startup there is a protection in case of unusual shock conditions yet the device can traverse resonant torque conditions of a higher magnitude than those that would be permitted during operation.

As above indicated clutches are sometimes used in the drive train of the mill to control torque applied to the mill for example from two separate power sources to balance the torque as described in Canadian Pat. No. 843,236 to Nelson, issued June 2, 1970 and in aforementioned Canadian Pat. No. 934,679. Obviously when the clutches are used to accelerate the mill up to drive speed or to balance the load caused by a plurality of drive motors there must of necessity be slippage in the clutch and thus the control device having the valve 74 mounted on the clutch 18 cannot be used. However, the type of clutch used may be essentially the same as that illustrated (but able to withstand significantly more slip without overheating), accordingly the passage 68 and tube 36 etc may be essentially the same.

Figure 5:
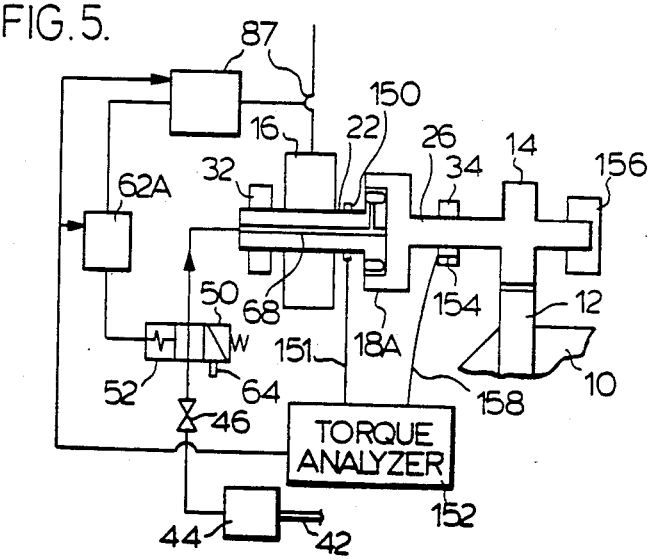
FIG. 5 is a schematic illustration of a modified form of the present invention for use where significant clutch slippage must be accommodated e.g. on start up or for load balancing between motors.

The embodiment schematically illustrated in FIG. 5 utilizes a clutch 18A similar to the clutch 18 but less the control valve 74 and related parts and of capacity to permit the required slippage for startup and/or load balancing. Since the control valve 74 and related parts are no longer available to release the clutch when resonant conditions damaging to the gears is encountered, other means for sensing resonance and degree of clutch slip must be used and the system modified in order to provide the required control. In FIG. 5 like reference numerals illustrate like parts between the embodiments shown in FIG. 5 and the embodiment shown in FIG. 1.

In the arrangement shown in FIG. 5 the air feed to the clutch 18A is similar to that shown in FIG. 1 and has been greatly simplified eliminating the normal air controls that are necessary to operate the clutch to bring the mill to operating speed or for load balancing. In the arrangement shown in FIG. 5 high pressure air from the line 42 is reduced in valve 44, and passed through needle valve 46 and control valve 50 into the bore 68 in the shaft 22. In this arrangement however the pressure switch 62 has been replaced with a switch 62A that controls the solenoid 52 of the valve 50 to change it from the operative position shown to the venting position described above.

Two techniques for detecting a resonant condition have been shown. Both of these techniques directly or indirectly sense the torque applied to the pinion 14 and thereby indirectly detect the amount of slippage of the clutch 18A. In one case a torque sensor 150 is applied to the shaft 22 (this could equally well be applied to the shaft 26) and the signal generated by the torque sensor 150 is conveyed via line 151 to a torque analyzer 152 which, when it senses a torque pattern similar to that shown in FIG. 4 of significant amplitude, i.e. clipped at the top and not at the bottom, and progressing for a preset period of time, automatically triggers the circuit breaker 87 and opens the switch 62A. The circuit breaker 87 cuts off power to the motor 16 and the switch 62A deenergizes the valve 50, i.e. deenergizing the solenoid 52 to shift the valve to venting position and vent the system including the air tubes 36 (not shown in detail in FIG. 5) and the passage 68.

Torque and clutch slippage may alternatively be sensed by a mechanical strain sensor 154 in one of the pinion bearings 34. In the embodiment illustrated in FIG. 5 the bearing 34 is an inboard bearing, although it could equally well be positioned in the outboard bearing which is indicated in this Figure at 156 and constitutes both a support and a thrust bearing for the shaft 26. In any event the sensor 154 senses stress in the bearing housing for bearing 34 and transmits this sensed stress via line 158 to the torque analyzer 152 which, as above indicated, analyzes the signal for a pattern similar to that shown in FIG. 4. When such a pattern is sensed, as above described, analyser 152 activates circuit breaker 87 and the switch 62A to close down the system, i.e. turn off the motor 16 and release the clutch 18A.

It will be evident that the torque analyzer can be set to sense clutch slippage (i.e. where the torque applied is greater than the torque transmitted by the clutch and a clipped signal is received) and after a predetermined time say 1 or 2 seconds automatically trigger the switch 62A and circuit breaker 87.

With the arrangement illustrated in FIG. 5 it will be apparent that if a sudden shock load of damaging magnitude is applied to shaft 22 by either a short circuit thrown across the terminals of motor 16 or a power system disturbance such as a lightning stroke or circuit breaker reclosure, this shock will not be transmitted to the gears as clutch 18A will slip. However, once the disturbance has passed, the clutch will cease to slip and the drive will continue to operate normally, the gearing having been protected. It is known control art that the torque analyzer 152 can be made to separately recognize the absolute value of a once through torque overload, and the sinusoidal torque variations of any appreciable magnitude caused by the onset of mechanical resonance. Therefore, the control system can be arranged to open the clutch and shut the drive down automatically upon the appearance of mechanical resonance, but to ride through and alarm only in the case of a once through power system fault.

Having described the invention, modifications will be evident to those skilled in the art without departing from the spirit of the invention as defined in the pending claims.

What I claim as new and desired to secure by Letters Patent of the United States is:

1. A drive gear overload protector for heavily loaded gears, said gears having a design yield strength at which said gears will fail comprising:
    a clutch means having a drive side and a driven side interposed between said gears and a driving motor;
    means for setting the maximum torque that may be transmitted between said drive and said driven sides of said clutch to a value so that said clutch slips before gears are subjected to a maximum stress less than said gear yield strength;
    means for detecting relative movement between said drive and said driven sides of said clutch;
    means for releasing said clutch and
    said means for detecting operating said means for releasing said clutch when the amount of said relative movement detected by said means for detecting exceed a preset value thereby to prevent undue slippage of said clutch.

2. A drive gear overload protector as defined in claim 1 wherein said clutch comprises an air clutch and wherein said means for setting the maximum torque comprises means for setting the air pressure supplied to said clutch.

3. A drive gear overload protector as defined in claim 2 wherein said means for detecting the relative movement between said drive and driven sides of said clutch comprises a cam surface rotating with one of said sides of said clutch and a bracket on the other side of said clutch whereby relative movement of said drive and said driven sides of said clutch causes relative movement of said cam surface and said bracket, said cam and bracket cooperating so that sufficient relative movement actuates said means for releasing said clutch.

4. An overload protector as defined in claim 3 wherein said means for releasing comprises a venting valve connected to an air system supplying air to said air clutch and wherein said valve vents air in said system when actuated by said means for detecting.

5. An overload protector as defined in claim 4 wherein said cam is connected to said venting valve, means biasing said cam against said bracket whereby movement of said cam relative to said bracket to a position where movement of said cam is no longer opposed by said bracket results in said cam and said valve being moved by said means biasing said cam to a venting position, venting said system.

6. An overload protector as defined in claim 5 wherein pressurized air is applied to said system via an axial bore in a shaft with which said venting valve rotates, a pressure relief valve providing air at constant pressure to said system from an air supply source, a needle valve in said system restricting the flow from said pressure release valve to said bore and a control valve directing air from said needle valve to said bore when activated and venting air from said bore when deactivated and a power switch controlled by pressure in said bore operating said control valve whereby when pressure is released within said system including said bore the pressure release valve automatically deactivates said control valve and provides a further vent to said system.

7. The system as defined in claim 2 wherein said means to detect also activates circuit breaker means for terminating operation of said motor.

8. The system as defined in claim 4 wherein said means to detect also activates circuit breaker means for terminating operation of said motor.

9. The system as defined in claim 5 wherein said means to detect also activates circuit breaker means for terminating operation of said motor.

10. The system as defined in claim 6 wherein said means to detect also activates circuit breaker means for terminating operation of said motor.

11. The system as defined in claim 2 wherein said means for detecting clutch slippage comprises means for sensing torque transmitted by said clutch, a torque analyzer analyzing the signal generated via said torque sensor for resonant torque conditions and clutch slippage, said torque analyzer releasing said clutch when resonant conditions generate a preset amount of clutch slippage.

12. The system as defined in claim 11 wherein said torque sensor comprises means for sensing the torque in a shaft delivering power from said drive motor to said gears.

13. The system as defined in claim 12 wherein said means for sensing torque comprises means for sensing the stress in a pinion bearing supporting structure.

14. The system as defined in claim 11 wherein said means to detect also activates circuit breaker means for terminating operation of said motor.

15. The system as defined in claim 12 wherein said means to detect also activates circuit breaker means for terminating operation of said motor.

16. The system as defined in claim 13 wherein said means to detect also activates circuit breaker means for terminating operation of said motor.

* * * * *